United States Patent
Tanaka

(10) Patent No.: US 8,368,454 B2
(45) Date of Patent: Feb. 5, 2013

(54) TEMPERATURE DETECTION CIRCUIT

(75) Inventor: Makoto Tanaka, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 118 days.

(21) Appl. No.: 12/842,631

(22) Filed: Jul. 23, 2010

(65) Prior Publication Data

US 2011/0032023 A1 Feb. 10, 2011

(30) Foreign Application Priority Data

Aug. 4, 2009 (JP) ................. 2009-181687

(51) Int. Cl.
*H01L 35/00* (2006.01)
*H01L 37/00* (2006.01)
*H03K 3/42* (2006.01)
*H03K 17/78* (2006.01)

(52) U.S. Cl. ...................................................... 327/512
(58) Field of Classification Search .................... 327/512
See application file for complete search history.

(56) References Cited

U.S. PATENT DOCUMENTS

| | | | | |
|---|---|---|---|---|
| 4,068,134 A * | 1/1978 | Tobey et al. | ................. | 327/541 |
| 5,838,192 A * | 11/1998 | Bowers et al. | ................ | 327/541 |
| 5,914,629 A | 6/1999 | Maki | | |
| 6,921,199 B2 * | 7/2005 | Aota et al. | ..................... | 374/178 |
| 7,033,072 B2 * | 4/2006 | Aota et al. | ..................... | 374/178 |
| 7,078,954 B2 * | 7/2006 | Watanabe | ..................... | 327/512 |
| 7,576,594 B2 * | 8/2009 | Shozo | ............................ | 327/538 |
| 7,579,899 B2 * | 8/2009 | Senriuchi et al. | ............. | 327/512 |
| 7,592,854 B2 * | 9/2009 | Watanabe | ..................... | 327/512 |
| 2006/0197581 A1 * | 9/2006 | Chun et al. | .................... | 327/512 |
| 2006/0226888 A1 * | 10/2006 | Watanabe | ..................... | 327/512 |
| 2007/0146047 A1 * | 6/2007 | Senriuchi et al. | ............. | 327/512 |
| 2008/0252360 A1 * | 10/2008 | Yoshikawa | .................... | 327/512 |
| 2009/0206912 A1 * | 8/2009 | Igarashi | ........................ | 327/512 |
| 2009/0295458 A1 * | 12/2009 | Kameyama et al. | .......... | 327/512 |
| 2010/0123510 A1 * | 5/2010 | Yoshikawa | .................... | 327/512 |
| 2010/0321091 A1 * | 12/2010 | Bernstein | ..................... | 327/512 |
| 2011/0001546 A1 * | 1/2011 | Guo et al. | ..................... | 327/512 |
| 2011/0032023 A1 * | 2/2011 | Tanaka | .......................... | 327/512 |

FOREIGN PATENT DOCUMENTS

| | | |
|---|---|---|
| JP | 9-133587 (A) | 5/1997 |
| JP | 2006-242894 (A) | 9/2006 |

* cited by examiner

*Primary Examiner* — Adam Houston
(74) *Attorney, Agent, or Firm* — Foley & Lardner LLP

(57) ABSTRACT

A temperature detection circuit includes, a first source follower circuit supplied with a first constant current, a second source follower circuit supplied with a second constant current, and a circuit obtaining a difference between an output voltage from the first source follower circuit and an output voltage from the second source follower circuit. Measurement errors attributable to transistor threshold voltages are canceled out by obtaining a difference between output voltages.

10 Claims, 8 Drawing Sheets

TEMPERATURE INCREASE
→ (1) AS MOBILITY μ DECREASES, IDS DECREASES (2) Vth DECREASES

TEMPERATURE DECREASE
→ (1) AS MOBILITY μ INCREASES, IDS INCREASES (2) Vth INCREASES

TEMPERATURE DETECTION CIRCUIT

REFERENCE TO RELATED APPLICATION

This application is based upon and claims the benefit of the priority of Japanese patent application No. 2009-181687, filed on Aug. 4, 2009, the disclosure of which is incorporated herein in its entirety by reference thereto.

TECHNICAL FIELD

The present invention relates to a temperature detection circuit. In particular, it relates to a temperature detection circuit that can be suitably incorporated in a semiconductor integrated circuit.

BACKGROUND

While semiconductor components are used in various systems such as an optical system and a drive system, it is known that characteristics of these semiconductor components change depending on the temperature. Thus, in order to measure the temperature and correct changes of the characteristics, temperature sensors are mounted. While these temperature sensors are required to have high detection efficiency, these temperature sensors are also required to be small and inexpensive, for example.

FIGS. 7A and 7B are block diagrams of temperature detection circuits disclosed in Patent Document 1 as conventional techniques. In FIGS. 7A and 7B, a constant current is caused to flow through a pn junction diode, and by using change of the temperature-dependent forward on-voltage, the temperature is measured.

FIG. 7C illustrates a configuration of a temperature detection circuit disclosed in Patent Document 1 as an invention. While a threshold voltage Vth and a drain current Ids are temperature-dependent parameters of a metal-oxide semiconductor (MOS) transistor, this document discloses a technique that aims to eliminate an impact of the temperature dependence of the threshold voltage Vth and to measure the temperature by using only the temperature characteristics of the drain current Ids. Specifically, the temperature detection circuit of FIG. 7C includes a potential control circuit 10 connected to a gate of a MOS transistor M0, to cancel out the temperature dependence of the threshold voltage Vth. Assuming that a threshold voltage and a gate voltage of the MOS transistor M0 are designated by Vth and Vgs, respectively, the potential control circuit 10 supplies a voltage to the gate of the MOS transistor M0, so that Vgs-Vth remains at a constant level regardless of the temperature.

FIG. 8A is a block diagram illustrating an overall configuration of a conventional temperature detection circuit disclosed in Patent Document 2, and FIGS. 8B and 8C are circuit diagrams of first and second voltage source circuits in FIG. 8A, respectively. According to Patent Document 2, by changing work functions (Vth) of field-effect transistors M1 and M2, an output voltage VPN, which is a gate-source voltage of the field-effect transistor M2, is made dependent on the temperature. Further, the document discloses that since a temperature coefficient TCR of the output voltage VPN changes depending on a ratio of channel lengths L, by adjusting the ratio of channel lengths L, a desired temperature coefficient TCR can be obtained.

Patent Document 1:
Japanese Patent Kokai Publication No. JP-H09-133587 A, which corresponds to U.S. Pat. No. 5,914,629.

Patent Document 2:
Japanese Patent Kokai Publication No. JP2006-242894 A, which corresponds to US Patent Application Publication No. US2006/0197581A1.

SUMMARY

The entire disclosures of the above-mentioned Patent Documents are incorporated herein by reference thereto. Analysis will be hereinafter made based on the present invention. The conventional temperature detection circuits in FIGS. 7A and 7B require processes for manufacturing accurate diodes. Further, to increase the temperature detection efficiency, an amplifier circuit needs to be connected or diodes need to be connected in multiple stages. Since the forward voltage is approximately 0.65 V, if multiple stages are used, a power supply voltage is restricted.

Based on the conventional temperature detection circuit in FIG. 7C, since the temperature conversion efficiency is determined by a resistance value, a highly accurate resistor is required. However, it is difficult to form a highly accurate resistor on a silicon chip. If a resistor is attached externally to improve the accuracy of a resistance value, costs and a mounting area are increased. In addition, since a wiring needs to be arranged, noise is increased, resulting in an increase of consumption current. To change the detection efficiency, the resistance value needs to be changed. Thus, since an output voltage changes, a dynamic range is restricted.

Further, as illustrated in FIGS. 8A to 8C, the conventional temperature detection circuit requires two types of N-channel transistors, a pair of M1 and M11 and a pair of M2 and M12, having work functions Vth widely different from each other. The temperature detection circuit also requires resistors R11 and R12. In addition, it is difficult to form a multiple stage structure to increase the detection efficiency.

These conventional temperature detection circuits cannot realize high temperature detection efficiency regardless of manufacturing variations.

According to an aspect of the present invention there is provided temperature detection circuit including: a first source follower circuit supplied with a first constant current; a second source follower circuit supplied with a second constant current; and a circuit obtaining a difference between an output voltage from the first source follower circuit and an output voltage from the second source follower circuit.

According to another aspect of the present invention there is provided a temperature detection circuit including: a first source follower circuit including cascaded source follower transistors each supplied with a predetermined constant current; a second source follower circuit including cascaded source follower transistors, the number of which is the same as that of the source follower transistors included in the first source follower circuit and each of which is supplied with a predetermined constant current; and a circuit obtaining a difference between an output voltage from the first source follower circuit and an output voltage from the second source follower circuit.

The meritorious effects of the present invention are summarized as follows.

According to the present invention, by obtaining a difference between output voltages from source follower circuits, manufacturing variations of transistor characteristics can be canceled out, and thus, the temperature can be detected accurately.

PREFERRED MODES

Figure 1A:
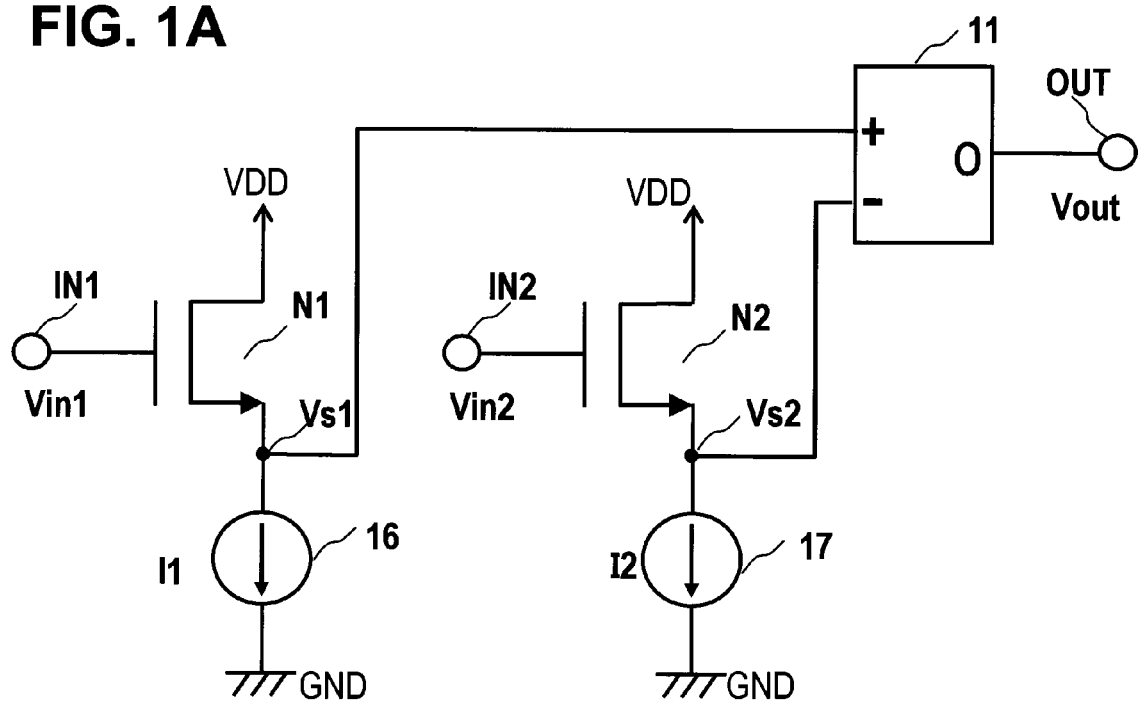
FIG. 1A is a block diagram illustrating an overall configuration of a temperature detection circuit according to example 1 of the present invention.

Outlines of exemplary embodiments according to the present invention will be hereinafter described. The drawings and reference characters referred to in the description of the following outlines are used to illustrate examples of the exemplary embodiments. Therefore, variations of the exemplary embodiments according to the present invention are not limited by the drawings and reference characters.

For example, as illustrated in FIG. 1, a temperature detection circuit according to an exemplary embodiment of the present invention includes a first source follower circuit N1 supplied with a first constant current I1; a second source follower circuit N2 supplied with a second constant current I2; and a circuit 11 obtaining a difference between an output voltage Vs1 from the first source follower circuit N1 and an output voltage Vs2 from the second source follower circuit N2. A mobility $\mu$ and a threshold voltage Vth of a MOS transistor are affected by the temperature. However, by obtaining a difference between the output voltages Vs1 and Vs2 outputted from the source follower circuits N1 and N2, respectively, an impact caused by the threshold voltages Vth can be canceled out. Thus, when the mobility $\mu$ is changed by the temperature and a gate-source voltage Vgs is also changed thereby, the temperature can be detected by detecting the change of the gate-source voltage Vgs.

Further, based on the temperature detection circuit according to an exemplary embodiment, the first source follower circuit includes a first source follower transistor N1, and a second source follower circuit includes a second source follower transistor N2 having a conductivity type identical to that of the first source follower transistor N1 and a transistor size different from that of the first source follower transistor N1. By allowing the first and second source follower transistors N1 and N2 included in the first and second source follower circuits, respectively, to have different sizes, the gate-source voltages Vgs exhibit different temperature characteristics. Thus, the temperature can be detected based on the potential difference.

Further, based on the temperature detection circuit according to an exemplary embodiment, a value of the second constant current I2 is different from a value of the first constant current I1. Namely, by setting different values for the first constant current value I1 flowing through the first source follower circuit N1 and the second constant current I2 flowing through the second source follower circuit N2, the gate-source voltages Vgs exhibit different temperature characteristics. Thus, the temperature can be detected.

Further, the temperature detection circuit according to the present invention may include a first constant current circuit 16 supplying the first constant current I1 to the first source follower circuit N1 and a second constant current circuit 17 supplying the second constant current I2 to the second source follower circuit N2.

Figure 2:
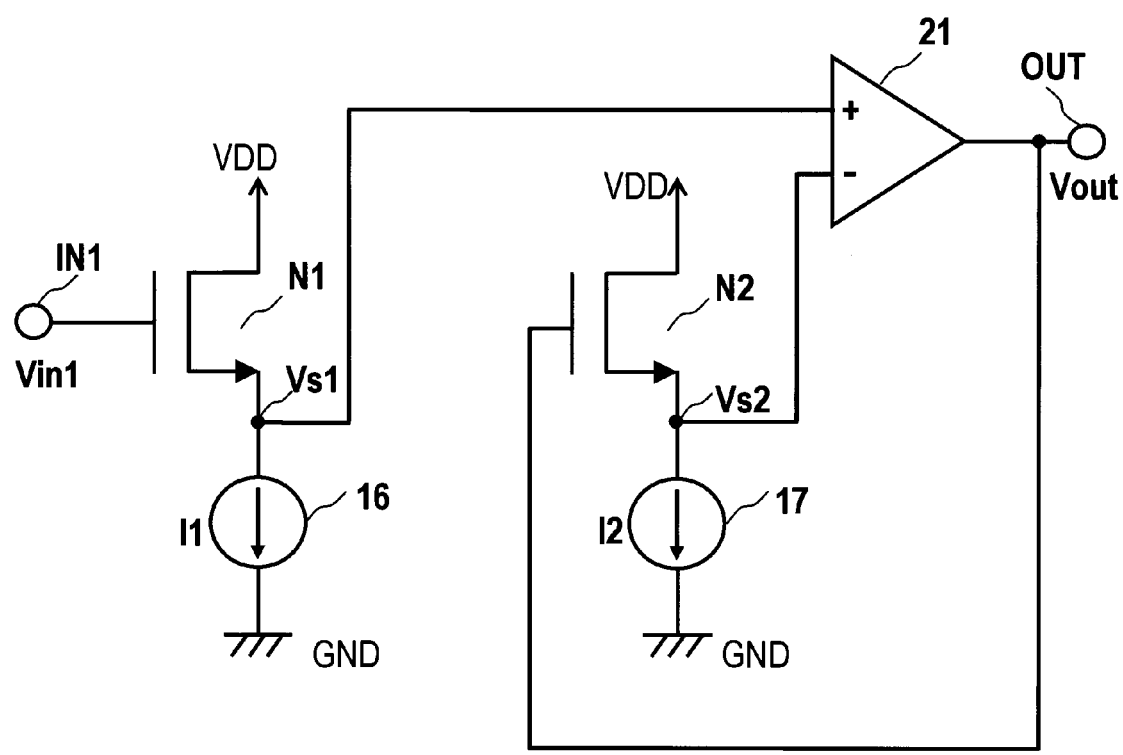
FIG. 2 is a block diagram of a temperature detection circuit according to example 2.

In addition, for example, as illustrated in FIG. 2, based on the temperature detection circuit according to an exemplary embodiment of the present invention, an output voltage Vout from a circuit 21 obtaining the difference is negative-feedback-connected as an input voltage to the first source follower circuit N1 or as an input voltage to the second source follower circuit N2, so that the output voltage Vs1 from the first source follower circuit N1 and the output voltage Vs2 from the second source follower circuit N2 are brought to be equal. According to the above configuration, the circuit 21 obtaining the difference may include an operational amplifier circuit. Further, one of the source follower circuits N1 and N2 (N2 in FIG. 2) is connected to an inverting input terminal of the operational amplifier circuit 21, and an output terminal of the operational amplifier circuit 21 is connected to a voltage input terminal of the source follower circuit (N2 in FIG. 2). In this way, the temperature can be detected.

In addition, for example, as illustrated in FIG. 2, the circuit 21 obtaining the difference includes an operational amplifier circuit 21 having a first differential input terminal (non-inverting input terminal) connected to a voltage output terminal (output voltage Vs1) of the first source follower circuit N1, a second differential input terminal (inverting input terminal) connected to a voltage output terminal (output voltage Vs2) of the second source follower circuit N2, and an output terminal OUT connected to a voltage input terminal (gate of N2 in FIG. 2) of one of the first and second source follower circuits N1 and N2. A voltage input terminal (IN1 in FIG. 2) of the other source follower circuit is supplied with a fixed potential.

Figure 6A:
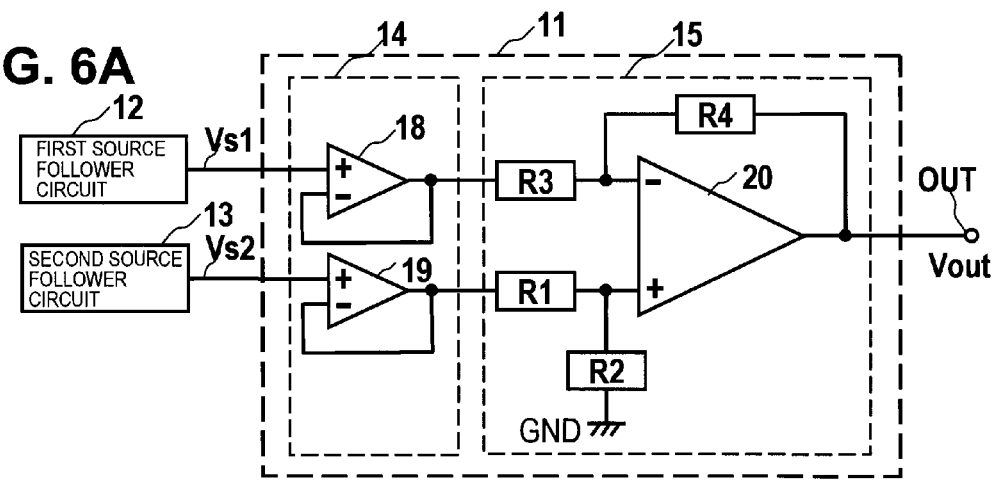
FIG. 6A is a block diagram illustrating an overall configuration of a temperature detection circuit according to example 6.
Figure 6B:
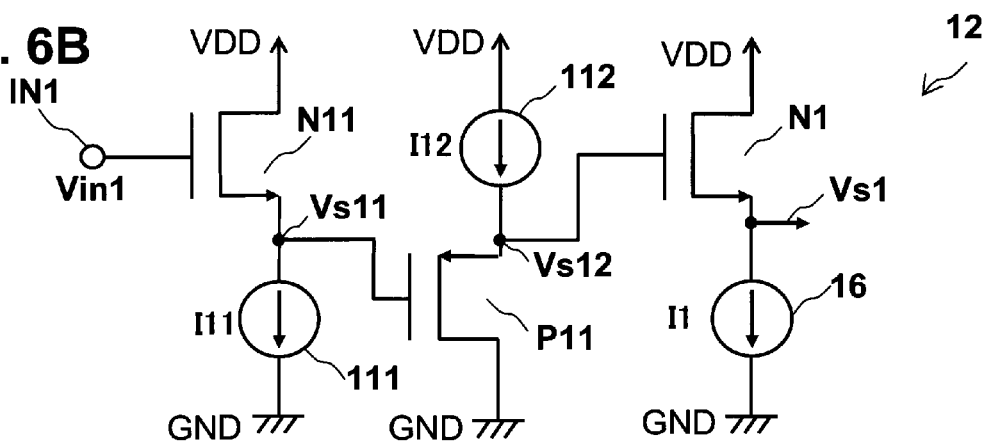
FIGS. 6B and 6C are block diagrams of first and second source follower circuits of the temperature detection circuit, respectively.
Figure 6C:
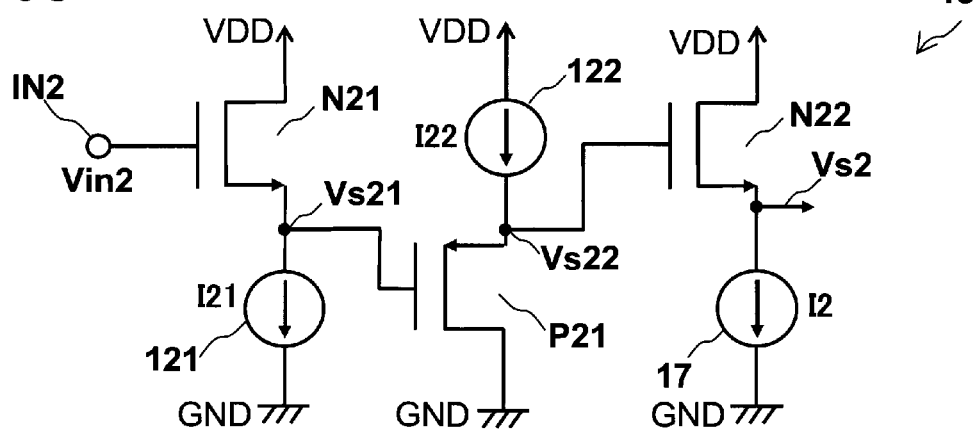
Figure 7A:
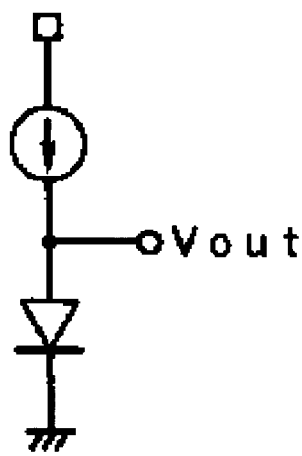
FIGS. 7A to 7C are block diagrams of conventional temperature detection circuits disclosed in Patent Document 1.
Figure 7B:
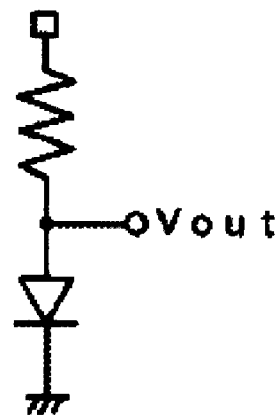
Figure 7C:
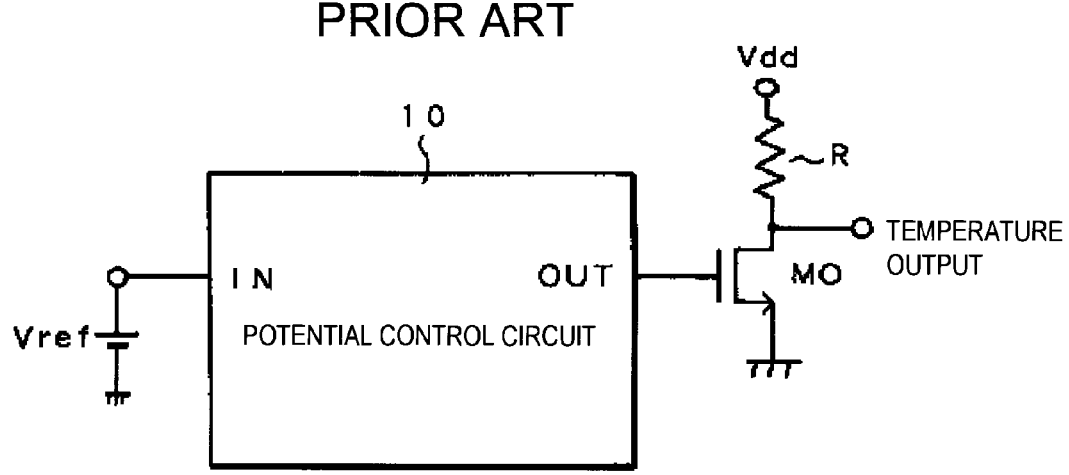
Figure 8A:
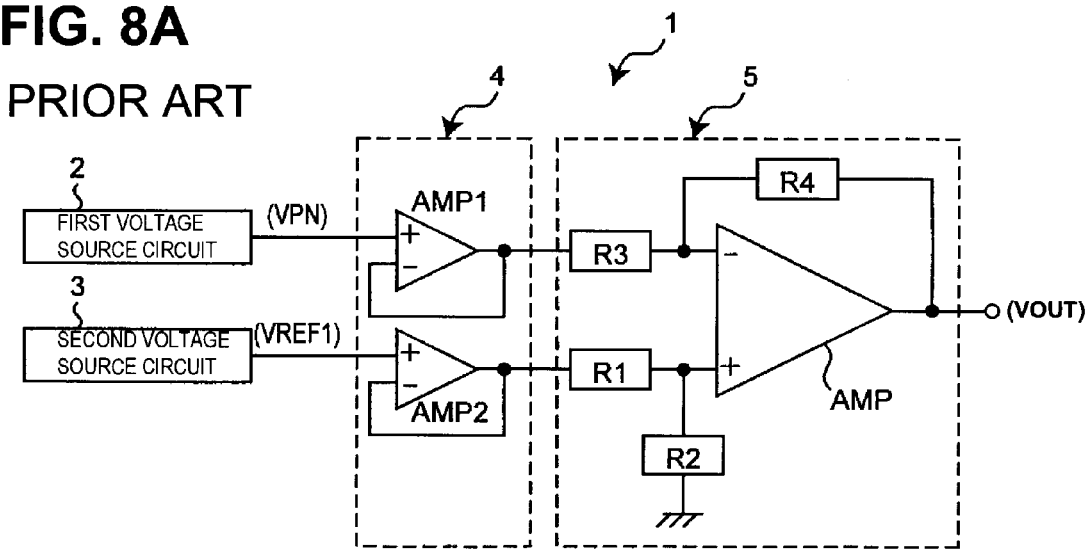
FIGS. 8A to 8C are block diagrams of a conventional temperature detection circuit disclosed in Patent Document 2.
Figure 8B:
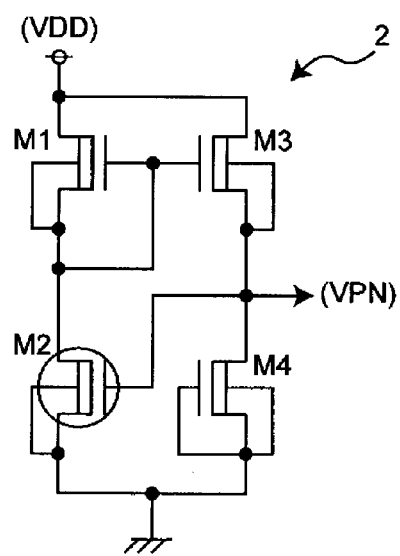
Figure 8C:
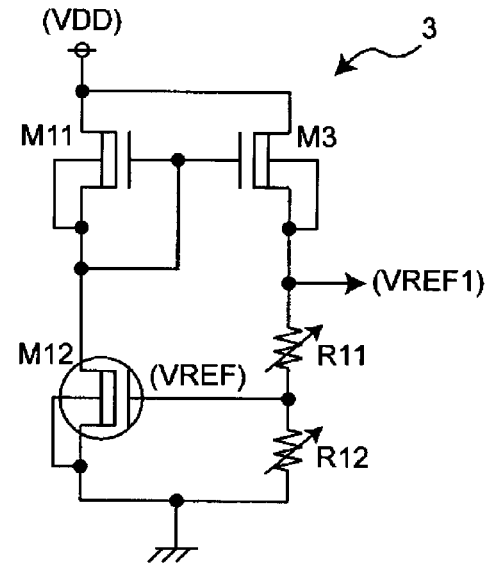

Further, for example, as illustrated in FIG. 3 or 6, fixed voltages are supplied as input voltages to the first and second source follower circuits 12 and 13, and the circuit 11 obtaining the difference outputs a voltage proportional to the difference between the output voltage Vs1 from the first source follower circuit N1 and the output voltage Vs2 from the second source follower circuit.

Figure 3A:
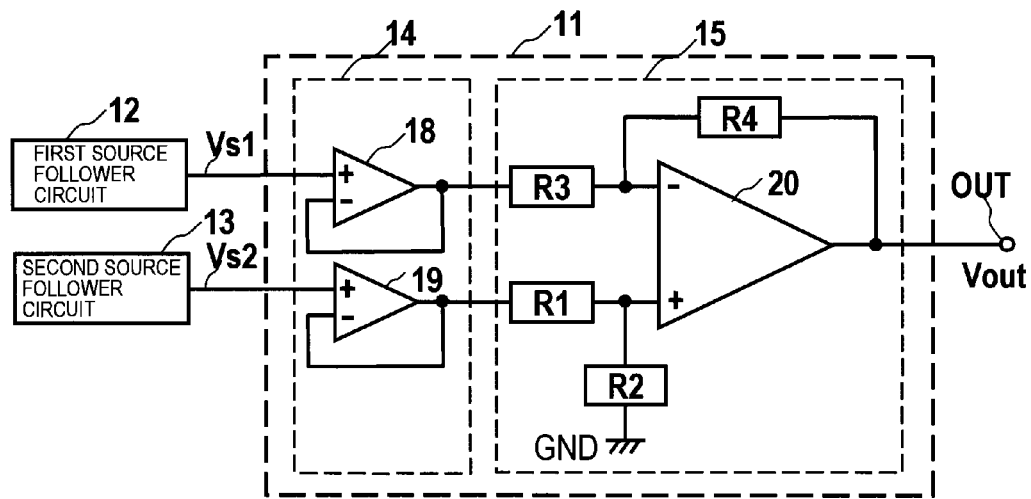
FIG. 3A is a block diagram illustrating an overall configuration of a temperature detection circuit according to example 3.
Figure 3B:
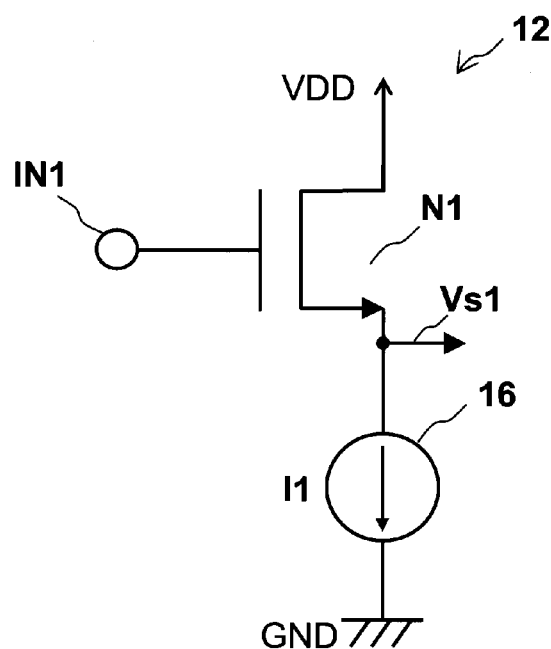
FIGS. 3B and 3C are block diagrams of first and second source follower circuits of the temperature detection circuit, respectively.
Figure 3C:
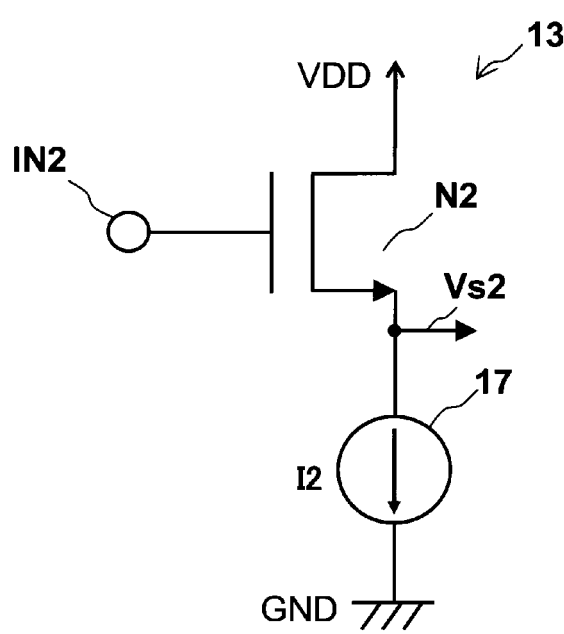
Figure 4:
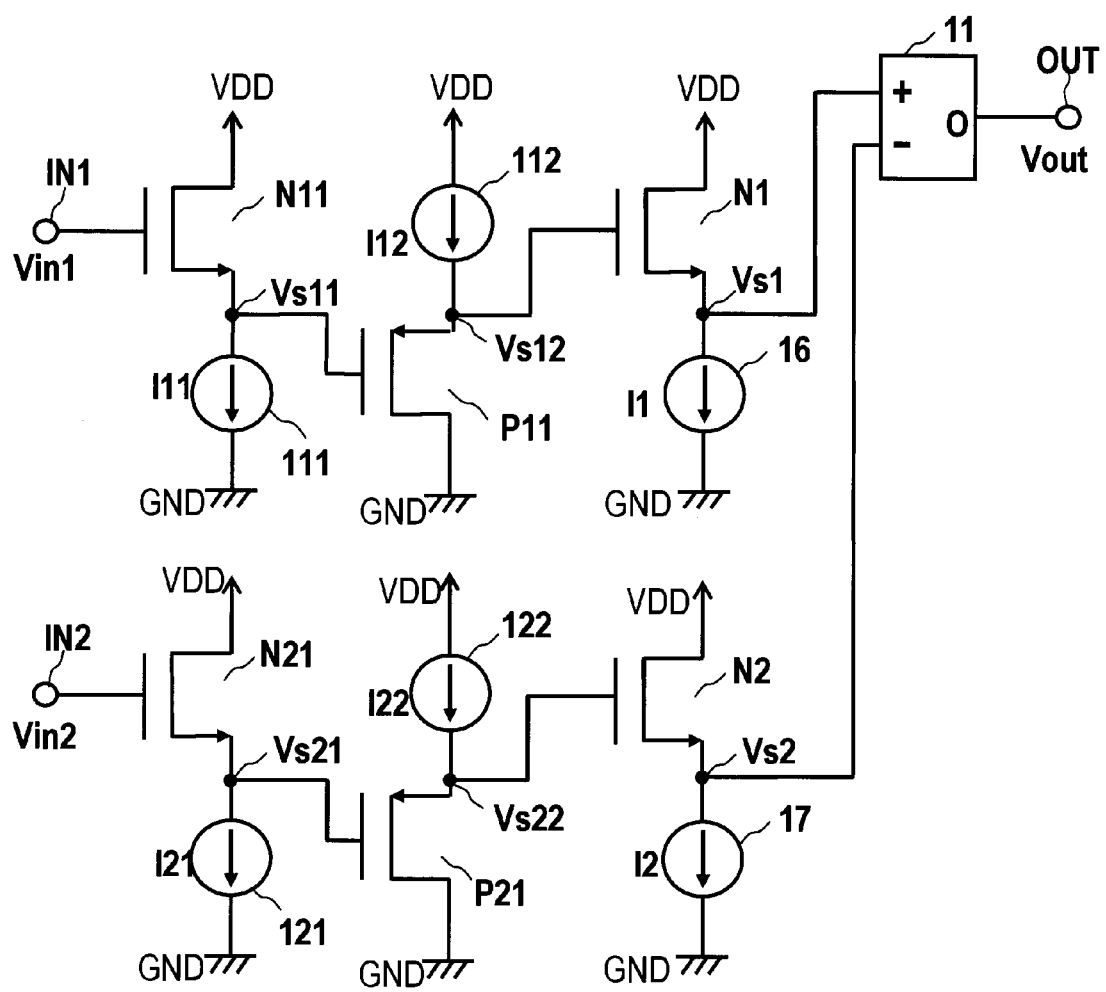
FIG. 4 is a block diagram of a temperature detection circuit according to example 4.
Figure 5:
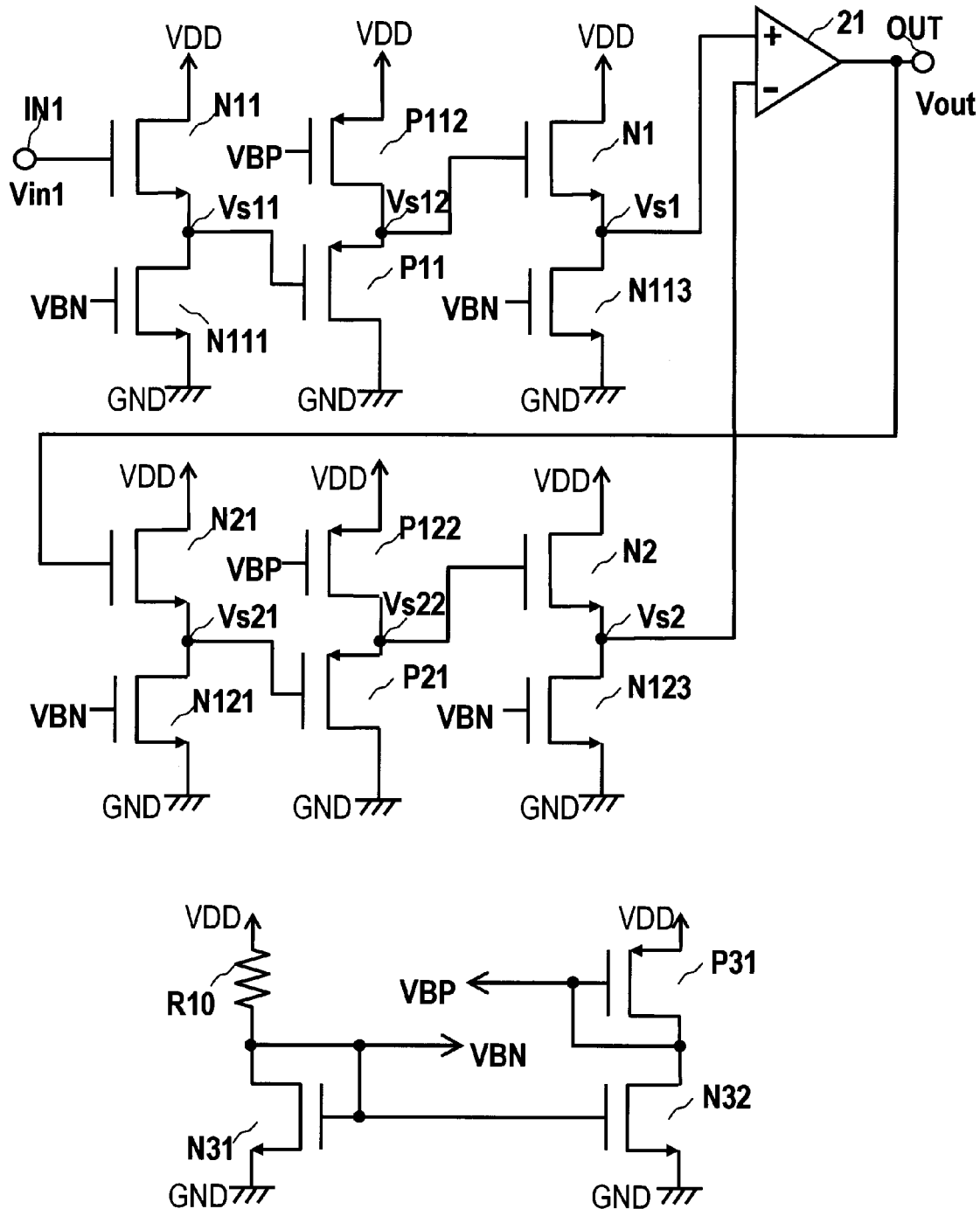
FIG. 5 is a block diagram of a temperature detection circuit according to example 5.

Further, for example, as illustrated in FIGS. 4 to 6, each of the first and second source follower circuits 12 and 13 are formed by source follower circuits cascaded in multiple stages, and each of the source follower circuits cascaded in multiple stages is supplied with a constant current. The first and second source follower circuits 12 and 13 and the circuit 11 obtaining the difference are formed on an identical semiconductor substrate. Any one of the temperature detection circuits illustrated in FIGS. 1 to 6 can also be formed on an identical semiconductor substrate. Further, as illustrated in FIGS. 1 to 6, the source follower transistors (N1, N11, P11) of the first source follower circuit and the source follower transistors (N2, N21, P21) of the second source follower circuit are manufactured in an identical transistor manufacturing process. Namely, since the first and second source follower circuits include source follower transistors of an identical conductivity type manufactured in an identical manufacturing process, even if a size slightly varies among the transistors, approximately the same threshold voltage Vth can be obtained. Thus, the circuit obtaining the difference can cancel out an impact of the source follower transistor threshold voltage Vth that affects detection of the temperature.

In addition, for example, as illustrated in FIGS. 4 to 6, a temperature detection circuit includes: a first source follower circuit 12 including cascaded source follower transistors (N11, P11, N1) each supplied with a predetermined constant current (I11, I12, I1); a second source follower circuit 13 including cascaded source follower transistors (N21, P21, N2), the number of which is the same as that of the source follower transistors (N11, P11, N1) included in the first source follower circuit 12 and each of which is supplied with a predetermined constant current (I21, I22, I2); and a circuit 11 obtaining a difference between an output voltage from the first source follower circuit 12 and an output voltage from the second source follower circuit 13. Even when sufficient temperature detection sensitivity cannot be provided by a single stage of source follower transistors, by cascading a plurality of source follower transistors, sufficient temperature detection sensitivity can be obtained. The constant currents (I11, I12, I1) each flowing through a corresponding stage of the first source follower circuit 12 and the constant currents (I21, I22, I2) each flowing through a corresponding stage of the second source follower circuit 13 may be set to have arbitrary values, in view of a target temperature detection sensitivity.

Further, for example, as illustrated in FIGS. 4 to 6, a gate of an arbitrary one (P11, N1, P21, N2) of the source follower transistors (N11, P11, N1, N21, P21, N2) of the first and second source follower circuits (12, 13), except for initial-stage source follower transistors (N11, N21), is connected to a source of a previous-stage source follower transistor (N11, P11, N21, P21).

Examples of the present invention will be hereinafter described in detail with reference to the drawings.

EXAMPLE 1

FIG. 1A is a block diagram illustrating an overall configuration of a temperature detection circuit according to example 1. In FIG. 1, the temperature detection circuit includes a first source follower transistor N1, a second source follower transistor N2, constant current circuits 16 and 17, and a difference circuit 11. Both of the first and second source follower transistors N1 and N2 are N-channel MOS transistors, gates of which are connected to input terminals IN1 and IN2 of the temperature detection circuit, respectively. Drains of the first and second source follower transistors N1 and N2 are connected to a positive power supply VDD. Further, sources (output voltages Vs1 and Vs2) of the first and second source follower transistors N1 and N2 are connected to the constant current circuits 16 and 17, respectively. The sources (output voltages Vs1 and Vs2) of the first and second source follower transistors N1 and N2 are also connected to input terminals of the difference circuit 11. Namely, the first and second source follower transistors N1 and N2 employ a source follower connection in which the drains thereof are connected to the ground (or the fixed voltage VDD) and each of the sources outputs a voltage based on a voltage applied to the gate corresponding thereto.

From an output terminal OUT, the difference circuit 11 outputs a voltage based on a voltage difference between the output voltage Vs1 from a first source follower circuit and the output voltage Vs2 from a second source follower circuit. Fixed voltages are applied to the input terminals IN1 and IN2 of the temperature detection circuit.

Next, an operation of the temperature detection circuit in FIG. 1A when subjected to a temperature change will be described. First, characteristic changes of a general MOS transistor when subjected to a temperature change will be described with reference to FIG. 1B.

Figure 1B:
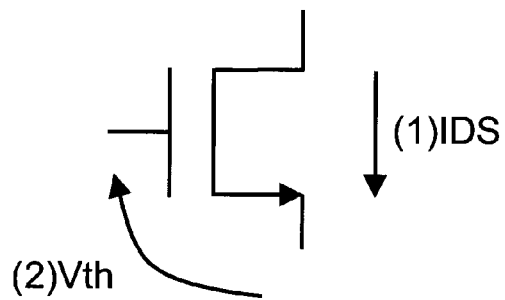
FIG. 1B illustrates temperature characteristics of a MOS transistor.

The following description will be made based on the assumption that the absolute temperature is 200° K or more and the impurity concentration is on the order of $10^{18}$ cm$^{-3}$ or less. As illustrated in FIG. 1B, when the temperature increases,
(1) a charge mobility μ in a channel of a MOS transistor decreases, and a source-drain current Ids decreases.
(2) Further, a threshold voltage Vth becomes close to 0 (since the Fermi level becomes close to 0), and the source-drain current Ids increases.

In contrast, when the temperature decreases,
(1) The charge mobility μ in the channel increases, and the source-drain current Ids increases.
(2) Further, an absolute value of the threshold voltage Vth of the transistor increases, and the source-drain current Ids decreases.

Namely, when a MOS transistor is subjected to a temperature change, the source-drain current Ids thereof changes. However, the mobility μ and the threshold voltage Vth of the transistor change reversely. The source-drain current Ids of the MOS transistor can be represented by the following formula (1) in a saturation characteristics region.

$$Ids = \frac{1}{2}\left(\frac{W}{L}\right) \cdot \mu \cdot Cox \cdot (Vgs - Vth)^2 \qquad \text{formula (1)}$$

In the above formula (1), W represents a channel width of the MOS transistor; L, a channel length; μ, a mobility; Cox, a gate oxide film capacity; Vgs, a gate-source voltage; and Vth, a threshold voltage. Further, the following formula (2) is obtained by using the above formula (1).

$$Vgs = \sqrt{Ids \cdot \frac{2 \cdot L}{W \cdot Cos \cdot \mu}} + Vth \qquad \text{formula (2)}$$

In FIG. 1A, assuming that the difference circuit 11 subtracts the voltage Vs2 from the voltage Vs1 and directly outputs the obtained voltage, an output voltage Vout from the difference circuit 11 can be represented by the following formula (3).

$$Vout = Vs1 - Vs2 \qquad \text{formula (3)}$$
$$= Vin1 - Vin2 -$$
$$\sqrt{Ids_1 \cdot \frac{2 \cdot L_1}{W_1 \cdot Cox \cdot \mu}} + \sqrt{Ids_2 \cdot \frac{2 \cdot L_2}{W_2 \cdot Cox \cdot \mu}}$$

In the above formula (3), $Ids_1$ and $Ids_2$ represent source-drain currents of the first and second source follower transistors N1 and N2, respectively. $L_1$ and $W_1$ represent a channel length and a channel width of the first source follower transistor N1, respectively. $L_2$ and $W_2$ represent a channel length and a channel width of the second source follower transistor N2, respectively. Since the source-drain currents $Ids_1$ and $Ids_2$ are constant currents I1 and I2 flowing through the constant current circuits 16 and 17, as long as current values of the constant current circuits 16 and 17 do not have temperature characteristics, the source-drain currents $Ids_1$ and $Ids_2$ are constant. Further, since the threshold voltage Vth of the transistor in formula (2) is canceled out by the difference circuit 11, the threshold voltage Vth is not present in formula (3). Thus, if input voltages Vin1 and Vin2 are fixed, based on formula (3), when the temperature changes, the output voltage Vout changes depending on the mobility μ alone. However, if the third and fourth terms in the right-hand side of formula (3) are completely canceled out, the output voltage Vout loses temperature dependence. Thus, a size ratio of $L_1/W_1$ to $L_2/W_2$ needs to be changed so that the output voltage Vout depends on the temperature. Alternatively, different current values may be set for the constant current circuits 16 and 17.

Namely, the threshold voltages Vth of the MOS transistors are not included in formula (3) to calculate the output voltage Vout of the temperature detection circuit of FIG. 1A. Thus, variations of the output voltage Vout with respect to variations of the threshold voltages Vth of the transistors are reduced. Thus, variations of the threshold voltages Vth of the MOS transistors, which is a significant factor among manufacturing variations, are canceled out and eliminated by obtaining a difference between the output voltages Vs1 and Vs2. In this way, overall variations, such as variations of a wafer as a whole, can be reduced. Sensitivity of the output voltage Vout to a temperature change can be changed arbitrarily by changing either the size ratio L/W of the two transistors N1 and N2 or the current values of the constant current circuits 16 and 17.

EXAMPLE 2

FIG. 2 is a block diagram of a temperature detection circuit according to example 2. In FIGS. 1 and 2, like reference characters denote like elements or functions, and the description thereof is omitted. In FIG. 2, the difference circuit 11 of FIG. 1 is replaced with a difference circuit 21 including an operational amplifier circuit. Further, the difference circuit 21 has an output terminal OUT connected to the gate of the second source follower transistor N2, and a fixed voltage is applied from the outside only to the input terminal IN1 connected to the gate of the first source follower transistor N1.

According to example 2, the output voltage Vout can be represented by the following formula (4).

$$Vout = Vin1 - \sqrt{Ids_1 \cdot \frac{2 \cdot L_1}{W_1 \cdot Cox \cdot \mu}} + \sqrt{Ids_2 \cdot \frac{2 \cdot L_2}{W_2 \cdot Cox \cdot \mu}} \qquad \text{formula (4)}$$

In example 1, the two fixed input voltages Vin1 and Vin2 need to be applied. However, in example 2, only the input voltage Vin1 needs to be applied. In addition, in example 1, the difference circuit 11 needs to be accurate for accurate measurement of the temperature. However, in example 2, the difference circuit 21 may be a simple differential amplifier circuit that amplifies a potential difference inputted to the input terminals infinitely and outputs the amplified potential difference.

EXAMPLE 3

FIG. 3A is a block diagram illustrating an overall configuration of a temperature detection circuit according to example 3. FIGS. 3B and 3C are block diagrams illustrating internal configurations of first and second source follower circuits 12 and 13, respectively. In example 3, internal configurations of the difference circuit 11 of example 1 will be described. Basically, a known circuit disclosed in Patent Document 2 can be used for the internal configuration of the difference circuit 11. The difference circuit 11 includes an impedance conversion circuit 14 including voltage-follower-connected operational amplifier circuits 18 and 19 and a subtraction circuit 15. Based on the configuration in FIG. 3, a range of the output voltage Vout, that is, the temperature detection sensitivity, can be changed arbitrarily based on values of resistors R1 to R4.

EXAMPLE 4

FIG. 4 is a block diagram illustrating a configuration of a temperature detection circuit according to example 4. In example 4, source follower circuits are cascaded in three stages. The source follower transistors are not limited to N-channel MOS transistors, and P-channel MOS transistors may also be used. As illustrated in FIG. 4, each of the source follower circuits outputs an output voltage Vs11, Vs21, Vs12, Vs22, Vs1, or Vs2. The input voltages Vin1 and Vin2 and the gate-source voltages Vgs of the source follower circuits in each stage are added and inputted to the difference circuit 11. Thus, temperature characteristics of the gate-source voltages Vgs in each stage are also added (or subtracted) and inputted to the difference circuit 11. Thus, even when source follower circuits in a single stage do not provide sufficient temperature detection sensitivity, by increasing the number of stages of the source follower circuits, sufficient temperature detection sensitivity can be obtained.

EXAMPLE 5

FIG. 5 is a block diagram illustrating a configuration of a temperature detection circuit according to example 5. In FIG. 5, the source follower circuits of the temperature detection circuit according to example 2 in FIG. 2 are cascaded in three stages. Additionally, FIG. 5 specifically illustrates circuits supplying constant currents to the source follower circuits in each stage. In FIG. 5, a reference resistor R10 determines currents flowing through a current mirror circuit formed by transistors N31, N111, N113, N121, N123, N32, P31, P112, and P122. Current values of the constant current circuits in each stage can be changed arbitrarily by the size ratio W/L of each of the above transistors N31, N111, N113, N121, N123, N32, P31, P112, and P122 forming the current mirror circuit. The configuration of the constant current circuits in FIG. 5 is an example and is not limited to the above configuration. Thus, the constant current circuits may be configured arbitrarily.

EXAMPLE 6

FIG. 6 is a block diagram illustrating a configuration of a temperature detection circuit according to example 6. The temperature detection circuit according to example 6 includes the first and second source follower circuits 12 and 13. The first source follower circuit 12 is formed by cascading three first source follower circuits 12 of example 3 in FIG. 3. The second source follower circuit 13 is formed by cascading three second source follower circuits 13 of example 3 in FIG. 3. According to the above configuration, as in example 4, even when source follower circuits in a single stage do not provide sufficient temperature detection sensitivity, by increasing the number of stages of the source follower circuits, sufficient temperature detection sensitivity can be obtained.

As described based on each of the above examples, the temperature detection circuit according to the present invention uses a difference between output voltages from source follower circuits, and in this way, transistor output variations attributable to manufacturing variations can be reduced. Generally, to increase the accuracy of a temperature detection circuit, the accuracy of a temperature sensor and a measurement system needs to be increased. However, according to the present invention, at least, an impact of variations of a transistor as a temperature sensor can be reduced.

In addition, based on the temperature detection circuit according to the present invention, the temperature detection efficiency and sensitivity can be changed easily. Further, as described in examples 4 to 6, the number of stages of the source follower circuits can be easily increased to improve the detection efficiency. All the above temperature detection circuits can be formed on a wafer and can be easily formed on a single chip.

Further, the temperature detection circuit can be formed by only one kind of MOSFETs, that is, P-channel MOSFETs or N-channel MOSFETs, as necessary elements. It is not necessary to use a special circuit or element for detecting the temperature. A semiconductor integrated circuit including the temperature detection circuit according to the present invention can be manufactured by a normal MOS semiconductor integrated circuit manufacturing process.

The present invention has thus been described based on the above examples. However, the present invention is not limited to the above examples. The present invention of course includes various variations and modifications that could be made by those skilled in the art within the scope of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A temperature detection circuit comprising:
   a first source follower circuit supplied with a first constant current;
   a second source follower circuit supplied with a second constant current; and
   a circuit obtaining a difference between an output voltage from the first source follower circuit and an output voltage from the second source follower circuit,
   wherein a value of the second constant current is different from a value of the first constant current, and
   wherein each of the first and second source follower circuits comprises a plurality of source follower circuits cascaded in multiple stages, and each of the plurality of source follower circuits cascaded in multiple stages is supplied with a constant current.

2. The temperature detection circuit according to claim 1, wherein the first source follower circuit comprises a first source follower transistor, and a second source follower circuit comprises a second source follower transistor having a conductivity type identical to that of the first source follower transistor and a transistor size different from that of the first source follower transistor.

3. The temperature detection circuit according to claim 1, further comprising:
   a first constant current circuit supplying the first constant current to the first source follower circuit; and
   a second constant current circuit supplying the second constant current to the second source follower circuit.

4. The temperature detection circuit according to claim 1, wherein an output voltage from the circuit obtaining the difference is negative-feedback-connected as an input voltage to the first source follower circuit or as an input voltage to the second source follower circuit, so that the output voltage from the first source follower circuit and the output voltage from the second source follower circuit are brought to be equal.

5. The temperature detection circuit according to claim 1, wherein the circuit obtaining the difference comprises an operational amplifier circuit having a first differential input terminal connected to a voltage output terminal of the first source follower circuit, a second differential input terminal connected to a voltage output terminal of the second source follower circuit, and an output terminal connected to a voltage input terminal of one of the first and second source follower circuits, and
   wherein a voltage input terminal of the other source follower circuit is supplied with a fixed potential.

6. The temperature detection circuit according to claim 1, wherein fixed voltages are supplied as input voltages to the first and second source follower circuits, and the circuit obtaining the difference outputs a voltage proportional to the difference between the output voltage from the first source follower circuit and the output voltage from the second source follower circuit.

7. The temperature detection circuit according to claim 1, wherein the first and second source follower circuits and the circuit obtaining the difference are formed on an identical semiconductor substrate.

8. The temperature detection circuit according to claim 1, wherein a source follower transistor of the first source follower circuit and a source follower transistor of the second source follower circuit are manufactured in an identical transistor manufacturing process.

9. A temperature detection circuit comprising:
   a first source follower circuit comprising cascaded source follower transistors each supplied with a predetermined constant current;
   a second source follower circuit comprising cascaded source follower transistors, the number of which is the same as that of the source follower transistors included in the first source follower circuit and each of which is supplied with a predetermined constant current; and
   a circuit obtaining a difference between an output voltage from the first source follower circuit and an output voltage from the second source follower circuit.

10. The temperature detection circuit according to claim 9, wherein each gate of the source follower transistors of the first and second source follower circuits, except for initial-stage source follower transistors, is connected to a source of a previous-stage source follower transistor.

* * * * *